(12) United States Patent
Lehmann

(10) Patent No.: US 7,784,393 B2
(45) Date of Patent: Aug. 31, 2010

(54) DRIVE UNIT WITH AN INTERIOR DRIVE UNIT AND AN EXTERIOR DRIVE UNIT

(75) Inventor: Steffen Lehmann, Ettlingen (DE)

(73) Assignee: LuK Lamellen und Kupplungsbau Beteiligungs KG, Buehl (DE)

(*) Notice: Subject to any disclaimer, the term of this patent is extended or adjusted under 35 U.S.C. 154(b) by 616 days.

(21) Appl. No.: 11/638,914

(22) Filed: Dec. 14, 2006

(65) Prior Publication Data

US 2007/0137968 A1    Jun. 21, 2007

(30) Foreign Application Priority Data

Dec. 21, 2005 (DE) .................. 10 2005 061 620

(51) Int. Cl.
F16D 41/22 (2006.01)

(52) U.S. Cl. .................. 92/45; 192/55.3; 192/110 B

(58) Field of Classification Search .................. 464/162, 464/169
See application file for complete search history.

(56) References Cited

U.S. PATENT DOCUMENTS

| | | | | | |
|---|---|---|---|---|---|
| 2,011,822 | A | * | 8/1935 | Munschauer | ............... 192/55.3 |
| 2,957,562 | A | * | 10/1960 | Rudisch | ................... 192/84.91 |
| 5,035,309 | A | * | 7/1991 | Takada | ........................ 192/45 |
| 5,067,601 | A | * | 11/1991 | Castens | ....................... 192/65 |
| 5,119,915 | A | * | 6/1992 | Nelson | ........................ 192/200 |
| 5,219,053 | A | * | 6/1993 | Castens | ....................... 192/45 |
| 5,328,012 | A | * | 7/1994 | Takata | ........................ 192/45 |
| 5,445,256 | A | * | 8/1995 | Tabuchi et al. | ........... 192/84.96 |
| 6,557,679 | B1 | * | 5/2003 | Warner et al. | ............. 192/17 D |
| 6,964,326 | B2 | * | 11/2005 | Kamping | .................. 192/55.5 |
| 2003/0019708 | A1 | * | 1/2003 | Goto et al. | ..................... 192/35 |

FOREIGN PATENT DOCUMENTS

| | | |
|---|---|---|
| DE | 195 35 889 | 4/1997 |
| DE | 199 14 529 | 10/1999 |

* cited by examiner

*Primary Examiner*—Rodney H Bonck
*Assistant Examiner*—Justin Holmes
(74) *Attorney, Agent, or Firm*—Simpson & Simpson, PLLC

(57) ABSTRACT

A drive unit with a radial interior drive element and a radial exterior drive element as well as a free-wheel arranged between the interior drive element and the exterior drive element. The interior drive element and the exterior drive element are axially displaceable in reference to each other.

14 Claims, 2 Drawing Sheets

DRIVE UNIT WITH AN INTERIOR DRIVE UNIT AND AN EXTERIOR DRIVE UNIT

CROSS REFERENCE TO RELATED APPLICATIONS

This patent application claims priority of German Patent Application No. 10 2005 061 620.8, filed Dec. 21, 2005, which application is incorporated herein by reference.

FIELD OF THE INVENTION

The present invention relates to a drive unit with a radial interior drive unit and a radial exterior drive unit as well as a free-wheel arranged between the interior drive unit and the exterior drive unit.

BACKGROUND OF THE INVENTION

German Patent No. DE 19914529 discloses a device in the form of a belt pulley unit with an overriding clutch. In order to prevent slippage of the belt on the pulley, being the exterior drive unit, a rubber part is arranged between the free-wheel and the exterior drive unit.

German Patent No. DE 19535889 discloses an overriding clutch for an alternator drive. In order to transmit axial forces, one radial bearing each is provided at both sides of the free-wheel, said bearings each being arranged between the interior and the exterior drive element.

Drive units of the prior art are disadvantageous in that they transfer axial vibrations almost without any damping and non-elastically.

SUMMARY OF THE INVENTION

The present invention broadly comprises a drive unit having a radial interior drive element and a radial exterior drive element as well as a free-wheel arranged between the interior drive element and the exterior drive element, with the interior drive element and the exterior drive element being displaceable in reference to one another. The axial displaceability can be achieved by a degree of freedom in the axial direction or preferably by an elastic connection. By the axial displaceability an at least partial decoupling of the interior drive element from the exterior drive element occurs—depending on a spring stiffness and, perhaps a damping of the connection means between the two drive elements. The drive unit preferably is embodied as a belt pulley unit, with the exterior drive element being a disk, in particular a belt pulley, and the interior drive element being a hub for mounting a shaft, for example a camshaft or the shaft effectively connected to a camshaft of an internal combustion engine of a vehicle. The hub may also be directly connected to a shaft in one piece.

Preferably, at the side of the hub, the free-wheel is provided with at least one spring element, which is elastic in the axial direction and connected to the hub. The free-wheel is then connected to the disk in a fixed manner, e.g., form fittingly or by friction. The free-wheel preferably comprises a free-wheel bracket, which is connected to the hub via the spring element. Preferably, it is also provided for the free-wheel bracket to comprise at least one protrusion and that the hub comprises at least one protrusion, with the spring element being located there between. The spring element is preferably a flat spring, with the flat spring in the disk level preferably being rotationally connected to the hub and/or the free-wheel bracket. The rotational bearing preferably comprises a swivel joint, with the swivel joint preferably comprising a bolt, particularly a rivet. Preferably it is further provided that a rotational bearing is arranged between the hub and the free-wheel bracket. The rotational bearing may preferably be a friction bearing or a roller bearing.

Alternatively, a geometrically inverse version is also possible, so that at the side of the disk the free-wheel is provided with at least one spring element, which is elastic in the axial direction, connected to the disk. The free-wheel is then connected to the hub in a fixed manner. In this alternative variant it is preferably provided that the drive unit comprises a free-wheel bracket, which is connected to the disk via the spring element. Additional embodiments of this geometrically inverse version are disclosed according to the respective embodiments, as described in the subclaims for the variant with the spring element located at the side of the hub. Alternatively the free-wheel may also be connected to each the hub and the disk via elastic elements.

In the present invention the axial decoupling from vibrations is enabled by axially soft elements, which are comparatively stiff in the circumferential direction. The axially necessary construction space is equivalent to solutions of prior art, i.e. no design changes are necessary when using e.g., belt pulleys with free-wheels according to prior art.

Therefore, it is an object of the present invention to provide a drive element, which allows at least partially a decoupling of the vibrations of the interior drive element from the exterior one.

BRIEF DESCRIPTION OF THE DRAWINGS

In the following, exemplary embodiments of the invention are explained using the attached drawings wherein.

DETAILED DESCRIPTION OF THE INVENTION

Figure 1:
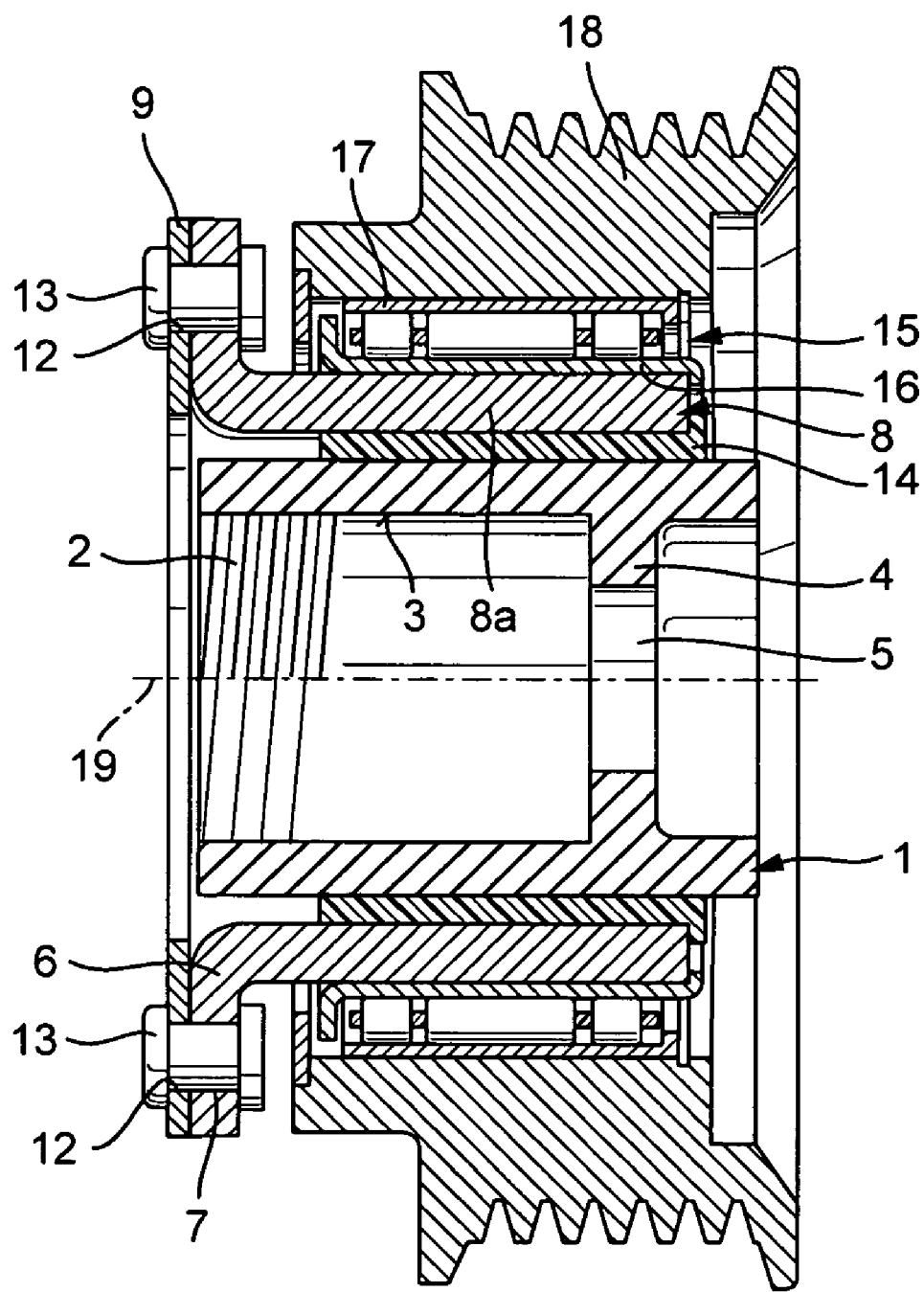
FIG. 1 is a cross-section through an exemplary embodiment of a free-wheel according to the invention; and, FIG. 2 illustrates the exemplary embodiment of FIG. 1 in a top view.
Figure 2:
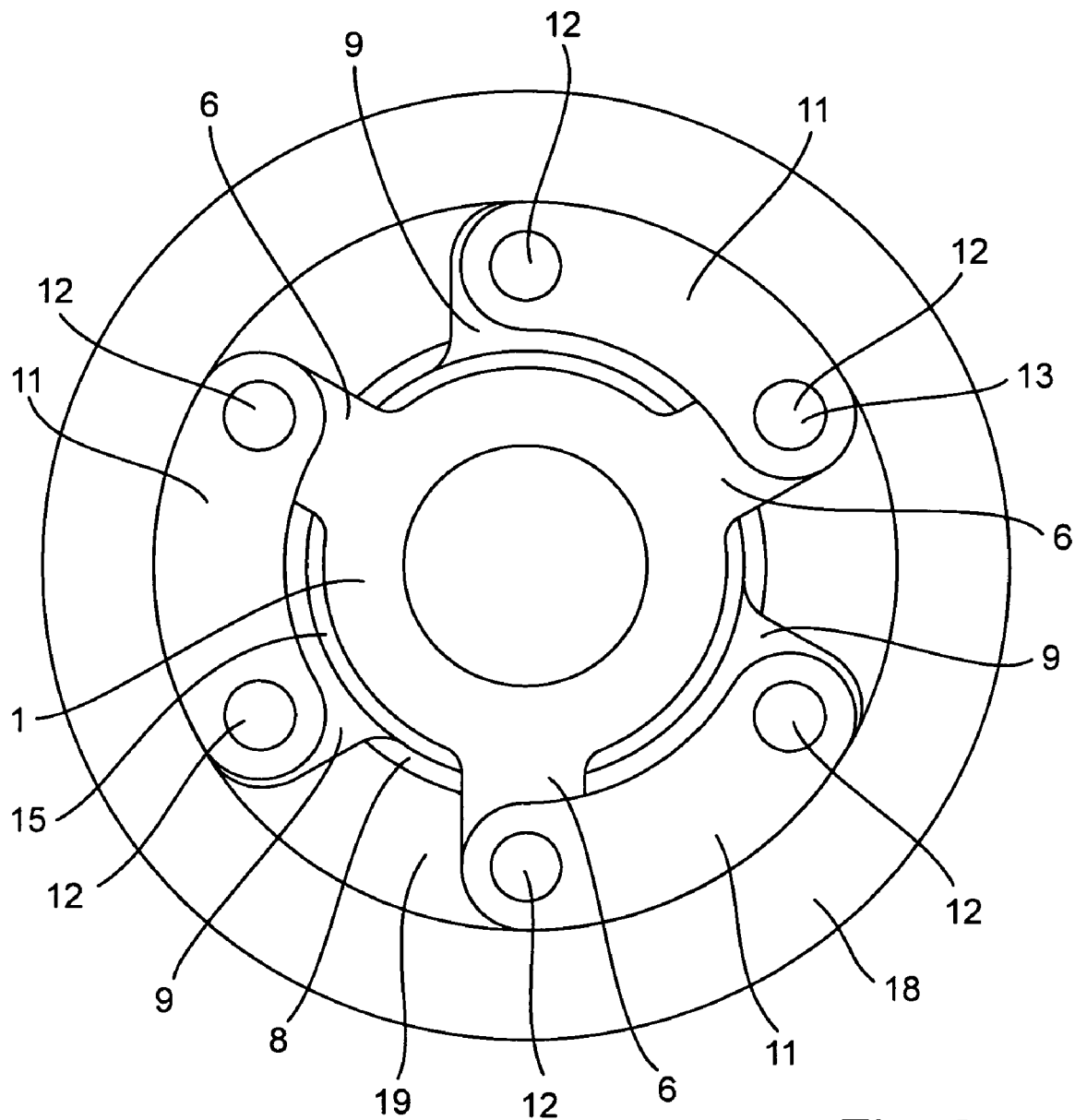

FIG. 1 shows an axial cross-section through an exemplary embodiment of a drive unit according to the invention. FIG. 2 shows the exemplary embodiment in a top view. Hub 1, being the radially interior drive element can be connected to a shaft, not shown. For this purpose, hub 1 comprises in a manner known per se, for example internal toothing 2, verging to shaft bearing 3, which in turn verges into breaker plate 4 having bore 5, so that hub 1 can be screwed onto a nut, for example by a stud bolt, to be connected for transmitting a torque onto a shaft, not shown. Alternatively it is possible to produce hub 1 and the shaft in one piece, thus the hub being a part directly formed at the shaft. At hub 1, at the side of hub protrusions 6 are embodied, provided with bore 7. Protrusions 6 of hub 1 are arranged extending radially outward at an angle of 90° in reference to essentially cylindrical bracket 1a of hub 1. Free-wheel bracket 8 is arranged radially outside hub 1, with protrusions 9 being formed at the side facing the free-wheel bracket. Protrusions 9 are bent radially outward at an angle of approximately 90° in reference to bracket 8a, having an essentially cylindrical shape. Bores 10 are each provided in protrusions 9.

Protrusions 6 and 9 are arranged in approximately the same radial level in reference to one another and are connected to each other alternately via flat springs 11 being the spring elements. Protrusion 6 at the side of the hub is each connected to protrusion 9 at the side of the free-wheel bracket. Additionally, flat springs 11 are provided with two bores 12 each, so that rivet 13 is arranged through bores 12 and one bore 7 each of protrusion 6 at the side of the hub and/or bore 10 of protrusion 9 at the side of the free-wheel bracket. Each rivet 13 is able to transfer forces radially acting upon it, thus transfers forces in the circumferential direction of hub 1 and/or free-wheel bracket 8. The stiffness of flat springs 11 in the circumferential direction is very strong here, the flexural stiffness in the axial direction of rotary axis 19 comparatively weak. Flat springs 11 allow transmission of torque between hub 1 and free-wheel bracket 8, with free-wheel bracket 8 being displaceable in the axial direction in reference to hub 1 against the spring force of flat springs 11.

Friction bearing 14 is arranged between hub 1 and free-wheel bracket 8, which may be a plastic socket, for example. The socket can be connected to free-wheel bracket 8 via a clamping connection or a screwed connection or the like, not shown in greater detail, or it may be impressed therein. Radially outside free-wheel bracket 8 free-wheel 15 follows, with interior shell 16 being connected to free-wheel bracket 8 in the circumferential direction as well as the axial direction in a force-fitting manner and exterior shell 17 is connected accordingly in the axial as well as the radial direction to belt-pulley 18 in a force fitting manner, forming the radially exterior drive element. Free-wheel 15 serves to transfer a torque between hub 1 and belt pulley 18 in one rotary direction, allowing a relative rotation of the two parts in reference to each other as freely as possible in the other rotary direction. Free-wheel 15 can be embodied in any manner known from prior art.

Instead of rivets 13, here screws or the like may also be used. Belt-pulley 18 can alternatively also be a sprocket, for example, or any other arbitrary rotating component and here it is therefore called disk, in general. The axial spring stiffness between hub 1 and free-wheel bracket 8 and thus the axial spring stiffness between hub 1 and belt pulley 18 depends on the geometry of flat springs 11. The narrower flat springs 11, i.e., the higher the ratio of the distance of bore 12 from the cross-section of flat spring 11, the lower the stiffness. The stiffness of flat springs 11 is therefore determined in the same manner as the stiffness of a bar. Instead of flat springs 11, here other spring elements may also be used. For example, protrusions 6 and 9 may also be aligned parallel in the axial direction and rubber buffers or the like may be arranged between two helical springs. In the present exemplary embodiment hub 1 and free-wheel bracket 8 each are provided with three protrusions, here the number of protrusions may also be selected differently, through, for example two protrusions each, or with four each, five, or more protrusions.

LIST OF REFERENCE CHARACTERS

1 Hub
2 Interior toothing
3 Shaft bearing
4 Breaker plate
5 Bore
6 Protrusion
7 Bore
8 Free-wheel bracket
9 Protrusion
10 Bore
11 Flat spring
12 Bores
13 Rivets
14 Friction bearing
15 Free-wheel
16 Interior shell
17 Exterior shell
18 Belt pulley
19 Rotary axis

What I claim is:

1. A drive unit comprising a radial interior drive element (1) and a radial exterior drive element (18) as well as a free-wheel (15) arranged between the interior drive element (1) and the exterior drive element (18), wherein the interior drive element (1) and the exterior drive element (18) are axially displaceable in reference to one another, wherein the free-wheel (15) is for connecting the interior and exterior drive elements such that relative rotation between the interior and exterior elements is possible in a first rotational direction, wherein the free-wheel (15) is for rotationally locking the interior and exterior drive elements in a second rotational direction opposite the first rotational direction, and wherein at least one spring element (11), which is elastic in the axial direction, is fixedly connected to the side of the free-wheel (15) and to the radial interior drive element (1) at a first axial end of the drive unit.

2. The drive unit recited in claim 1, wherein the interior drive element is a hub (1) and the exterior drive element is a belt pulley (18).

3. The drive unit recited in claim 2, wherein the free-wheel (15) comprises a free-wheel bracket (8), which is connected to the hub (1) via the spring element (11).

4. The drive unit recited in claim 3, wherein the free wheel bracket (15) comprises at least one protrusion (9) and the hub (1) comprises at least one protrusion (6), with a spring element (11) being arranged there between.

5. The drive unit recited in claim 4, wherein the spring element (11) is a flat spring.

6. The drive unit recited in claim 5, wherein in the level of the disk the flat spring (11) is rotationally connected to the hub (1) and/or the free-wheel bracket (8).

7. The drive unit recited in claim 6, further comprising a moveable bearing.

8. The drive unit recited in claim 7, wherein the moveable bearing comprises a swivel joint (7, 10, 12).

9. The drive unit recited in claim 8, wherein the swivel joint comprises a bolt (12), in particular a rivet.

10. The drive unit recited in claim 3, wherein a rotary bearing (14) is arranged between the hub (1) and the free-wheel bracket (8).

11. The drive unit recited in claim 10, wherein the rotary bearing (14) is a friction bearing.

12. The drive unit recited in claim 10, wherein the rotary bearing (14) is a roller bearing.

13. The drive unit recited in claim 1, wherein at the side of the disk the free-wheel (15) is connected to the disk by at least one spring element (11), which is elastically connected to a spring in the axial direction.

14. The drive unit recited in claim 13, further comprising a free-wheel bracket (8) connected to the disk (18) via a spring element (11).

* * * * *